SEALING DISC FOR TAPE HANDLING APPARATUS

Filed July 1, 1968 3 Sheets-Sheet 1

INVENTORS
JOHN W. FECHER &
VIRGIL W. FISHER

BY Louis A Kline
Albert L. Sessler, Jr.
Elmer Wargo
THEIR ATTORNEYS

SEALING DISC FOR TAPE HANDLING APPARATUS

Filed July 1, 1968 3 Sheets-Sheet 2

INVENTORS
JOHN W. FECHER &
VIRGIL W. FISHER

BY Louis A. Kline
Albert L. Sessler, Jr.
Elmer Wargo
THEIR ATTORNEYS

SEALING DISC FOR TAPE HANDLING APPARATUS

Filed July 1, 1968 3 Sheets-Sheet 3

INVENTORS
JOHN W. FECHER &
VIRGIL W. FISHER
BY
Louis A. Kline
Albert L. Sessler, Jr.
Elmer Wargo
THEIR ATTORNEYS

United States Patent Office 3,507,432

Patented Apr. 21, 1970

3,507,432

SEALING DISC FOR TAPE HANDLING APPARATUS

John W. Fecher and Virgil W. Fisher, Kettering, Ohio, assignors to The National Cash Register Company, Dayton, Ohio, a corporation of Maryland Filed July 1, 1968, Ser. No. 741,360
Int. Cl. B65h *23/10*
U.S. Cl. 226—89 8 Claims

ABSTRACT OF THE DISCLOSURE

Means for facilitating the loading of perforated tape in a tape-handling apparatus which employs vacuum chambers in a slack-loop, control system. A light-weight, sealing disc is dimensioned to move in first and second vacuum chambers and to restrict the passage of air therepast. In normal operation, the disc is supported on the bight of a loop of the tape extending into the second chamber, and the disc and the loop are maintained in the second chamber by a differential pressure means associated with the chambers. For convenience in loading tape into the chambers, the differential pressure means is reversed from normal operation, causing the sealing disc to move out of the second chamber into the first chamber to be held at a seat therein until the tape loading is completed. After loading, the differential means is reversed to move the loop and the sealing disc into the second chamber for normal operation.

BACKGROUND OF THE INVENTION

This invention relates to record media handling means, and, more particularly, it relates to means for facilitating the loading of perforated tape in a tape-handling apparatus which employs vacuum chambers in a tape, slack-loop, control system.

The use of vacuum chambers and sealing discs for controlling the lengths of slack loops in a tape-handling apparatus is known, as shown in United States Patent No. 2,862,675, which issued Dec. 2, 1958, on the application of Duncan N. MacDonald. One of the problems existing in tape-handling devices of this type is that the presence of the sealing member in a vacuum chamber complicates the tape-loading procedure.

The instant invention obviates the problem of an interfering sealing disc during loading by providing a convenient means for moving the disc to a non-interfering position during the tape-loading operation, and for returning it to the normal operating position upon the completion of the tape-loading operation.

SUMMARY

The present invention relates to means for facilitating the loading of perforated tape in a tape-handling apparatus which employs vacuum chambers in a slack-loop, control system. A light-weight, sealing disc is dimensioned to move in first and second vacuum chambers and to restrict the passage of air therepast. In normal operation, the disc is supported on the bight of a loop of the tape extending into the second chamber, and the disc and the loop are maintained in the second chamber by a differential pressure means associated with the chambers.

When tape is to be loaded into the apparatus, the flow of air from said pressure means is reversed from normal operation, causing the sealing disc to move out of the second chamber into the first chamber and to be held at a seat therein until the tape loading is completed. After the tape loading is completed, control means are used to reverse the flow of air in the differential pressure means to move the loop of the tape and the sealing disc into the second chamber for normal operation.

DESCRIPTION OF THE PREFERRED EMBODIMENT

Figure 1:
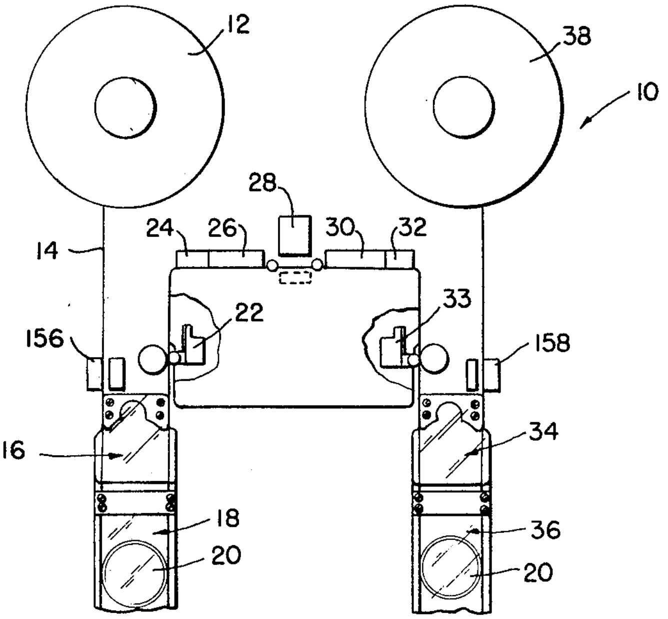
FIG. 1 is a front view, in elevation, showing how the chambers used in this invention are generally oriented in a tape-handling apparatus.

FIG. 1 shows the general arrangement of the invention in a tape-handling apparatus designated generally as 10. The apparatus 10 includes a supply reel 12 containing a perforated paper tape 14, which is threaded along one side of a first vacuum chamber 16, which is vertically aligned with a second vacuum chamber 18. The chamber 18 is adapted to receive a loop of tape 14, and a sealing member 20 is supported on the bight of the loop as shown. The tape 14 is exited out of the chamber 18 on the right side thereof (as viewed in FIG. 1) and passes along the outside (at the right side) of the chamber 16 to a conventional rotating capstan and pinch roll assembly 22. From the assembly 22, the tape 14 is fed past an "out of tape" detector 24 and a brake assembly 26, and past a read head 28. From the read head 28, the tape 14 is fed past another brake assembly 30 and an "out of tape" detector 32, and to a rotating capstan and pinch roll assembly 33. From the assembly 33, the tape 14 passes along the outside of a vacuum chamber 34, which is a duplicate of the chamber 16, and into a chamber 36, which is a duplicate of the chamber 18. The tape 14 has a loop formed in the chamber 36 which supports a sealing member 20 on the bight thereof, as was done in the chamber 18. From the chamber 36, the tape passes along the outside of the chamber 34 and is wound upon the take-up reel 38.

Figures 3, 4:
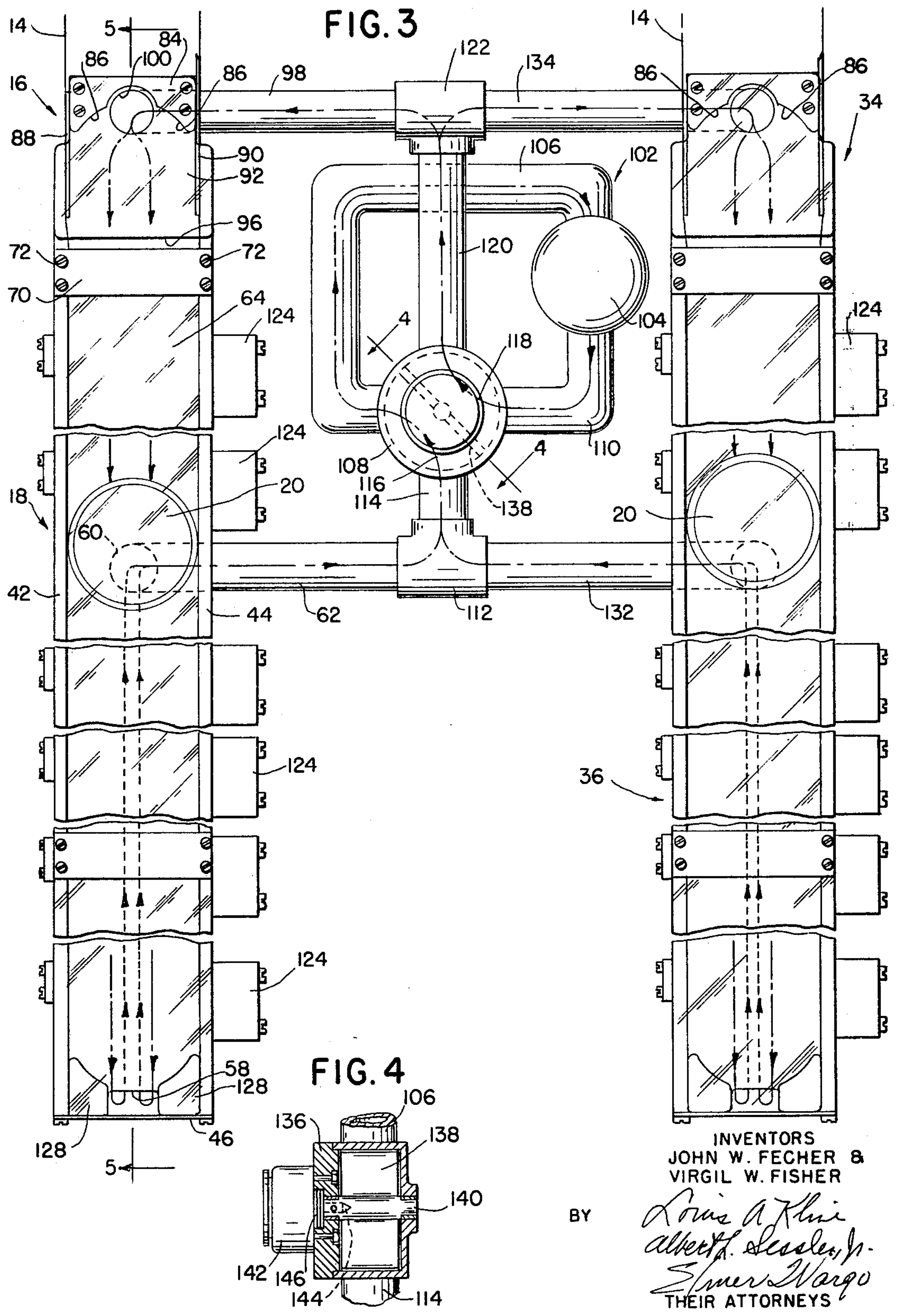
FIG. 3 is an enlarged, front view, in elevation, of the vacuum chambers shown in FIG. 1, and it also shows the reversing valve and the connecting conduits used in this invention.
FIG. 4 is a cross-sectional view, taken along the line 4—4 of FIG. 3, showing more details of the reversing valve.
Figure 5:
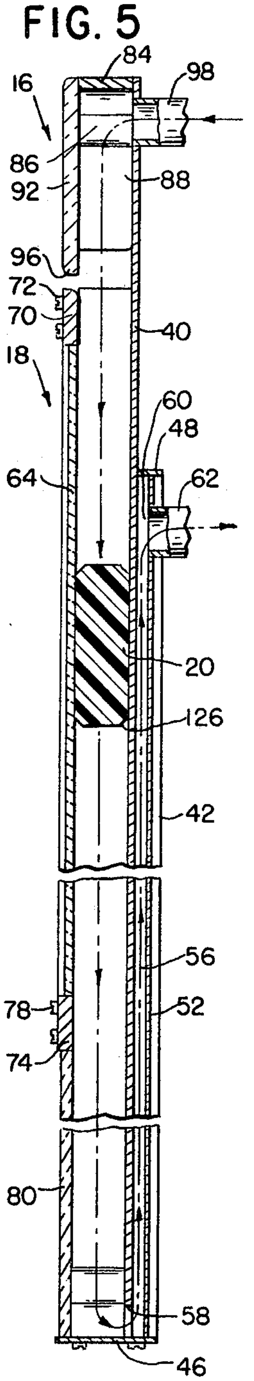
FIG. 5 is a cross-sectional view, taken along the line 5—5 of FIG. 4, showing more details of the vacuum chambers and the connecting conduits.
Figures 6, 7, 8:
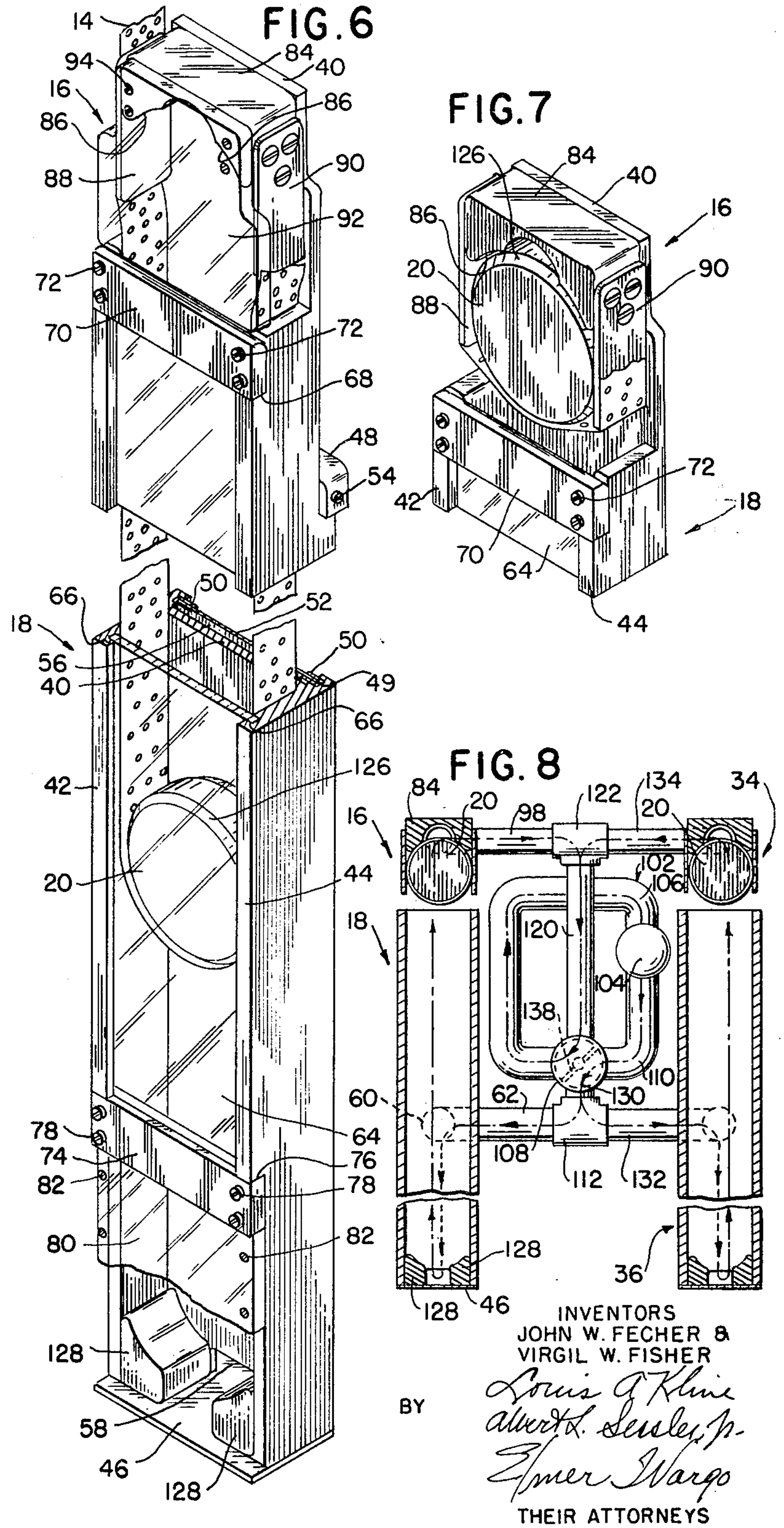
FIG. 6 is a general perspective view of one set of vacuum chambers, with certain portions thereof shown in cross section, and with a perforated tape and a cylindrical element in position during a normal feeding operation of the tape.
FIG. 7 is a general perspective view of an upper portion of one of the vacuum chambers, showing the cylindrical member seated therein to facilitate insertion of a tape into the lower chamber.
FIG. 8 is a front elevational view, partly in cross section, showing the reversing valve in a position to retain the cylindrical members in the upper portion of the chambers to facilitate insertion of a tape.

FIGS. 3, 5, and 6 show more details of the vacuum chambers 16 and 18. Because the chambers 34 and 36 are identical to the chambers 16 and 18, respectively, a description of only the chambers 16 and 18 will be given. The chambers 16 and 18 have a common back plate 40 (FIGS. 5 and 6), which extends for their entire length, which in the embodiment shown is about four feet. The back plate 40 is part of a one-piece metal structure having spaced, parallel side plates 42 and 44. A plate 46 is secured to the bottom of the structure as shown. The one-piece metal structure has an H-shaped cross section, which extends from the plate 46 to a cover plate 48 (FIGS. 5 and 6), the back plate 40 forming the web of the H. From the cover plate 48 to the top end of the back plate 40 (as viewed in FIGS. 5 and 6), the one-piece metal structure is actually U-shaped in cross section, with the plate 40 forming the joining member of the U.

The portion of the one-piece metal structure between the bottom plate 46 and the cover plate 48 (FIG. 5 and 6) is utilized to form a duct or compartment for the chamber 18 as follows. Portions of the side plate 42 and 44 are utilized to form side walls of the duct as shown, and these side walls have opposing, facing recesses 49 (FIG. 6) therein. A support member 50, being U-shaped in cross section, receives each lateral edge of a back plate 52, and, when the members 50 are on the back plate 52, the members 50 with the plate 52 therebetween are inserted into the recesses 49. After the back plate 52 and the members 50 are inserted, the cover plate 48, which is U-shaped in cross section, is secured to the side plates 42 and 44 by fasteners 54 to form an air-sealed compartment 56. The lower end of the back plate 40 (as viewed in FIGS. 5 and 6) has an opening 58 therein to provide a port which connects the compartment 56 with the vacuum chamber 18. Near the upper end of the compartment 56, the plate 40 has a second opening 60 therein to provide a port which connects a conduit 62 with the compartment 56. The conduit 62 is part of the means for producing a differential pressure in the chambers 16 and 18, which means will be later described.

The front plate 64 (FIGS. 3, 5, and 6) of the chamber 18 is transparent and is slid into facing, opposing recesses 66 in the side plates 42 and 44. A notched-outer area 68 (FIG. 6) in the side plates 42 and 44 is provided to enable the front plate 64 to be inserted into the recesses 66. After the plate 64 is in place in the recesses 66, a bar 70 is positioned in the notches 68 and is secured to the side plates 42 and 44 by fasteners 72. The lower end of plate 64 (as viewed in FIGS. 5 and 6) is supported on a cross bar 74, which fits against a shoulder 76 in the side plates 42 and 44 and is secured thereto by fasteners 78. The lowermost portion of the chamber 18 is closed by a transparent plate 80, which fits between the bar 74 and the bottom plate 46, and the plate 80 is secured to the side plates 42 and 44 by fasteners 82. It is apparent from FIG. 6 that the bottom plate 46 extends beyond the width of the side plates 42 and 44 to provide a lip portion, against which the plate 80 abuts to form an air-tight connection therebetween.

The first chamber 16 (FIGS. 3, 5, 6, and 7) is constructed as follows. A seat member 84 is secured to the back plate 40. The seat member 84 has arcuate recesses 86 formed therein to receive the sealing member 20 when it is located in the chamber 16. The width of the plate 40 is narrower at the top (as viewed in FIG. 6) than at its center, and the seat member 84 corresponds to this width. On opposite parallel sides of the seat member 84, plates 88 and 90 are secured, as is best shown in FIGS. 3, 6, and 7. The seat member 84 and the plates 88 and 90 are so dimensioned as to enable these plates to be positioned between the side plates 42 and 44 and yet provide a sufficient clearance for the tape 14 to slide between the plate 88 and the side plate 42 and to slide freely between the plate 90 and the side plate 44. A transparent cover plate 92 abuts against the plates 88 and 92 and is secured to the seat member 84 by fasteners 94 to form the chamber 16. The lower edge 96 (FIGS. 3 and 5) of the cover plate 92 is so spaced from the bar 70 as to facilitate the insertion of tape into the chambers. The chamber 16 has a conduit 98 connected thereto at a port 100, which is located near the topmost portion of the chamber 16, as viewed in FIG. 3.

The first and second chambers 16 and 18, respectively, and their duplicates 34 and 36 are connected to the differential pressure means, designated generally, as 102, as shown in FIGS. 3 and 8. The differential pressure means includes a pump 104 having one end of an inlet conduit 106 connected thereto, with the other end of the conduit 106 connected to a reversing valve 108. The pump 104 also has one end of an outlet conduit 110 connected thereto, with the other end of the conduit 110 also connected to the reversing valve 108.

With the reversing valve 108 positioned as shown in FIG. 3 (which is the normal operating position), the differential pressure means 102 is effective to create a sub-atmospheric pressure in the chamber 18, and an above-atmospheric pressure in the chamber 16, as follows. The conduit 62 is connected to a T-shaped conduit 112, which communicates with a conduit 114 leading to the reversing valve 108. The air in the chamber 18 is vacated by the pump 104, and the air flow is such that a low pressure is created in the chamber 18 below the sealing member 20, and the air being vacated from the chamber 18 passes through the opening 58, through the compartment 56, through the conduit 62, through the conduit 114, through the reversing valve 108 (as indicated by the arrow 116), and through the conduit 106 to the inlet side of the pump 104. The outlet, or high pressure, side of the pump 104 forces air through the conduit 110, through the reversing valve 108 (as indicated by the arrow 118), through a conduit 120 connected to a T-shaped conduit 122, and through the conduit 98 to the chamber 16 to create a higher pressure in the chamber 16 than that which exists in the chamber 18.

FIG. 3 shows the valve 108 set in a first position, which operates the differential pressure means 102 in the normal tape-feeding operation. When the valve 108 is set in this position, the sealing member 20 in the chamber 18 substantially blocks the passage of air therepast, and a low-pressure area is produced in the chamber 18 between the sealing member 20 and the opening 58. This low-pressure area causes the sealing member 20 to pull the tape 14 towards the end of the chamber 18 having the opening 58 therein. The increased pressure in the chamber 16, at this time, also tends to force the sealing member 20 and the loop of the tape 14 in the direction of the opening 58. Along the sides of the chamber 18, there are positioned known sensors 124 (like electro-optical sensors), which detect the presence or absence of the sealing member 20 and the tape 14. These sensors 124 are used with conventional control circuits (not shown) which maintain the sealing member 20 and the length of the loop of the tape 14 within certain limits in the chamber 18 for the normal tape-feeding operation. For example, the outputs of the sensors 124 may be used to control the speed and the direction of rotation of the motors (not shown) associated with the capstan assemblies 22 and 33 to increase or decrease the lengths of the tape loops in the chambers 18 and 36, as required to isolate the tape drives from the reels 12 and 38 (FIG. 1).

The sealing member 20, which is a thick disc, is made of a solid, light-weight material like urethane. The width of the member 20, as measured in an axial direction, is slightly less than the shorter cross-sectional width of the chambers 16 and 18, and its diameter is slightly less than the longer cross-sectional width of said chambers. The edges 126 of the members 20 are chamfered to facilitate movement within the vacuum chambers 16, 18, 34, and 36. Because the sealing member 20 is dimensioned relative to the interior of the vacuum chambers, various widths of tape 14 can be accommodated within these chambers without impairing the sealing effectiveness of the member 20. The sealing member 20 substantially blocks the flow of air through the holes of the tape 14 when in the normal operating positions.

When the valve 108 is set in a second position (as shown in FIG. 8), it is effective to reverse the differential pressures in the chambers 16 and 18, so as to cause an increased pressure in the chamber 18 and a decreased pressure in the chamber 16, which moves the sealing member 20 out of the chamber 18 and into the chamber 16 against the seat member 84 therein. The chamber 18 has a split seat member 128 to limit the extent of travel in the chamber 18. With the sealing member 20 against the seat member 84, the tape 14 may be threaded between the plates 88 and 42, through the opening between the bar 70 and the adjacent edge 96 of the cover plate 92, under the sealing member 20 (as viewed in FIG. 7), and between the plate 90 and the side plate 44. The tape 14 may be threaded in the same manner around the sealing member 20 associated with the chambers 34 and 36 when the tape is threaded at that area of the apparatus 10.

With the valve 108 set in the second position, as shown in FIG. 8, the air flow through the various vacuum chambers is as follows. The air exhausted by the pump 104 passes out the conduit 110, through the reversing valve 108 (as indicated by the arrow 130) to the T conduit 112, where the air flow divides into the conduit 62 and another conduit 132, which last two conduits lead to the bottom of the chambers 18 and 36, respectively. This air flow urges the sealing members 20 towards their respective seat members 84 in the chambers 16 and 34. At the same time, the pressure in the chambers 16 and 34 drops, due to their being connected to the intake side of the pump 104. The conduit 98 from the chamber 16 is connected to the T conduit 122, which is also connected to a conduit 134 communicating with the chamber 34. From the conduit 122, the air being vacated from the chambers 16 and 34 passes through the conduit 120, through the reversing valve 108, and through the conduit 106 to the intake side of the pump 104.

The valve 108 is a conventional reversing valve (FIGS. 3, 4, and 8) having a housing 136 (FIG. 4), in which a deflecting vane 138 is located. The vane 138 is fixed to rotate with a shaft 140, which is rotatably mounted in the housing 136. A rotary solenoid 142, secured to the housing 136, has a shaft 144, which is pinned to the shaft 140 to rotate the shaft 140 and the vane 138 to the load position, shown in FIG. 8, when the solenoid 142 is energized. When the solenoid 142 is deenergized, a rotary spring 146 returns the vane 138 to the position shown in FIG. 3, which is the normal operating position.

Figure 2:
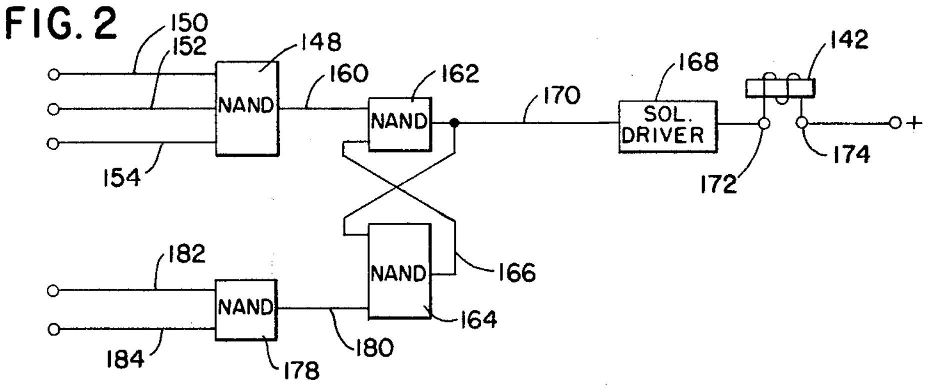
FIG. 2 is a diagram, in block form, of a circuit used in controlling a reversing valve which controls the pressure differential created in the chambers of FIG. 1.

In the embodiment shown in the drawings, the control means for operating the solenoid 142 is shown in FIG. 2. The control means, which includes conventional components, is shown only in block form, and includes a NAND gate 148 having inputs 150, 152, and 154. The input 150 is connected to a conventional sensor 156 (FIG. 1) and to the topmost sensor 124 (FIG. 3), which together detect the presence or absence of tape in the chambers 16 and 18, and the input 152 is connected to another conventional sensor 158 (FIG. 1) and to the topmost sensor 124 (FIG. 3) of the chamber 36, which together detect the presence or absence of tape in the chambers 34 and 36. The input 154 is connected to a load switch (not shown) which is part of the tape-handling apparatus 10. The output of the NAND gate 148 passes over a conductor 160 to the input side of a NAND gate 162. Another input to the NAND gate 162 is connected to the output of a NAND gate 164 by a conductor 166. The output of the NAND gate 162 is connected to the input of a solenoid driver 168 by a conductor 170. One end 172 of the solenoid 142 is connected to the output of the driver 168, and the remaining end 174 of the solenoid 142 is connected to a source of electrical potential. The output of the NAND gate 162 is also connected to a first input to the NAND gate 164 by a conductor 176. A second input to the NAND gate 164 is connected to the output of a NAND gate 178 by a conductor 180. The input 182 to the NAND gate 178 is at a "one," or positive, signal level during normal operation of the apparatus 10, indicating that the apparatus is not in load. The input 182 is operatively connected to the input 154 via a conventional electronic latch (not shown), so that, when the input 154 is at a "zero," or negative, signal level, the input 182 is at a "one" level and vice versa. The input 184 is operatively connected to both sensors 156 and 158, so that the input 184 shifts to a "one" level when tape is present in either of said sensors.

The general operation of the control means shown in FIG. 2 is as follows. Assume that the tape-handling apparatus 10 is in normal operation (FIG. 3), with the tape being fed through the vacuum chambers. At this time, the inputs 150 and 152 would be at a "zero" level, indicating that tape is present in the chambers 18 and 36, respectively. The inputs 150 and 152 shift to a "one" level when no tape is present in their associated chambers 18 and 36, respectively. The input 154 would also be at a "zero" level in normal operation. The input 154 shifts to a "one" level when the load button, previously mentioned, is actuated. With any one of three inputs to the NAND gate 148 at a "zero" level, the output thereof shifts to a "one" level, which is routed to the NAND gate 162 via the conductor 160. The input 182 to the NAND gate 178 is at a "one" level during normal running, as previously explained, and, because the tape is present in the apparatus 10 during normal running, the input 184 is also at a "one" level. The input 184 is at a "one" level when the inputs 150 and 152 are both at "zero" level, and, when any one of these latter two inputs shifts to a "one" level, the input 184 shifts to a "zero" level. The input 184 is at a "one" level when the ape is loaded in both chambers 18 and 36. With both inputs to the NAND gate 178 at a "one" level, the output thereof shifts to a "zero" level, which is routed to the NAND gate 164 via the conductor 180. A "zero" level on either input to the NAND gate 164 produces a "one" level at its output, which is routed to the NAND gate 162. With both inputs of the NAND gate 162 at a "one" level, its output shifts to a "zero" level, which is also routed to the NAND gate 164 via the conductor 176. The "zero" level output from the NAND gate 162 is routed to the solenoid driver 168 via the conductor 170, and the "zero" level input to the driver 168 does not permit energizing current to pass through the solenoid 142; therefore, the spring 146 (FIG. 4) of the solenoid 142 keeps the valve 108 in the normal operating position, shown in FIG. 3.

When the reader apparatus runs out of tape, each of the inputs 150 and 152 to the NAND gate 148 shifts to a "one" level. When the operator actuates the load switch, the input 154 to the NAND gate 148 also shifts to a "one" level. With the three inputs to the NAND gate 148 shifting to the "one" level, its output shifts to a "zero" level, causing the output of the NAND gate 162 to shift to a "one" level. A "one" level output from the NAND gate 162 causes the solenoid driver 168 to permit current flow through the solenoid 142. With the solenoid 142 energized, the reversing valve 108 is moved to the position shown in FIG. 8, resulting in the sealing members 20 being moved to the first chambers 16 and 34, as previously explained. The tape 14 can now be loaded into the apparatus 10. As the input 154 goes to a "one" level, upon actuation of the load switch, the input 182 (with which it is operatively connected) shifts to a "zero" level, and the input 184 also shifts to a "zero" level. Two "zero" level inputs to the NAND gate 178 cause its output to shift to a "one" level. With two inputs of "one" level on the NAND gate 164, its output shifts to a "zero" level, which is routed to the NAND gate 162. As soon as the tape 14 is loaded, each of the inputs 150 and 152 shifts to a "zero" level, and the input 184 shifts to a "one" level. When the run button is actuated for the apparatus 10, the input 154 shifts to a "zero" level, and the input 182 shifts to a "one" level, causing the output of the NAND gate 162 to shift to a "zero" level (to put the reversing valve in the normal running position, shown in FIG. 3), and the output of the NAND gate 164 shifts to a "one" level.

In another embodiment of the control means, a simple switch (not shown) may be used to operate the solenoid 142.

What is claimed is:

1. In an apparatus for handling perforated tape, the combination comprising:

a chamber into which a loop of tape may depend;

a cylindrical element positionable in the chamber, supported by the bight of the tape, and being of substantially the same cross-sectional configuration as the interior of the chamber;

a seat positioned above the chamber and having interior cross-sectional configuration substantially the same as the interior cross-sectional configuration of the chamber, so as to be capable of receiving the cylindrical element;

means for producing a differential pressure with respect to the chamber and the seat so as to urge the cylindrical element into the chamber for normal operation of the apparatus; and means for producing a reversed differential pressure with respect to the chamber and the seat so as to urge the cylindrical element into the seat in order to facilitate loading of tape into the apparatus.

2. In an apparatus for handling perforated tape, the combination comprising:

first and second vacuum chambers, each having a closed end and an open end, with said open ends being adjacent to each other;

said second chamber being dimensioned to receive a loop end of a perforated tape to be inserted therein;

a sealing member being dimensioned to move in said first and second chambers and to restrict the passage of air therethrough, said sealing member being supported on the bight of said loop end when the tape and the member are positioned in said second chamber;

means for producing a differential pressure in said chambers so as to urge said sealing member and loop end towards the closed end of said second chamber;

and means for producing a reversed differential pressure in said chambers so as to urge said sealing member out of said second chamber and into said first chamber towards the closed end thereof so as to facilitate the loading of tape into said second chamber.

3. In an apparatus for handling perforated tape, the combination comprising:

first and second vacuum chambers each having a closed end and an open end with said open ends being adjacent to each other, and with each said closed end having a port therein; said second chamber being dimensioned to receive a loop of a perforated tape to be positioned therein;

pump means, including conduit means connecting said pump means to said chambers at said ports so as to produce a differential air pressure in said chambers;

a sealing member dimensioned to move in said first and second chambers and to restrict the passage of air therethrough when positioned in said chambers, said sealing member being supported on the bight of said loop when the tape and the sealing member are positioned in said second chamber;

and valve means for operating said pump means in a first mode which produces a below-atmospheric pressure in said second chamber and an above-atmospheric pressure in said first chamber so as to urge the tape and said sealing member towards the closed end of said second chamber, and for operating said pump means in a second mode which reverses the pressures in said first and second chambers so as to urge said sealing member out of said second chamber and into said first chamber, thereby facilitating the loading of tape into said second chamber.

4. The apparatus as claimed in claim 3 in which said first and second chambers are aligned to facilitate the transfer of said sealing member from said second chamber to said first chamber and vice versa.

5. The apparatus as claimed in claim 3 in which said sealing member is cylindrically shaped and is made of a solid, light-weight material.

6. The apparatus as claimed in claim 5 in which said first and second chambers are rectangular in cross-section, and said sealing member has an axial width which is slightly less than the shorter cross-sectional dimension of said chambers and has a diameter which is slightly less than the longer cross-sectional dimension of said chambers; said sealing member having chamfered edges to facilitate its movement in said chambers.

7. The apparatus as claimed in claim 5 in which the open ends of said chambers are vented to the atmosphere.

8. The apparatus as claimed in claim 3 further including control means for operating said valve means so as to effect said first and second modes of operation.

References Cited

UNITED STATES PATENTS

| | | | |
|---|---|---|---|
| 2,796,930 | 6/1957 | Bennett | 226—195 X |
| 3,436,003 | 4/1969 | Fujiwara | 226—97 |

RICHARD A. SCHACHER, Primary Examiner

U.S. Cl. X.R.

226—97, 113, 118, 195